United States Patent
Li et al.

(10) Patent No.: US 6,873,776 B2
(45) Date of Patent: Mar. 29, 2005

(54) WAVEGUIDE FIBER FOR DISPERSION AND SLOPE COMPENSATION

(75) Inventors: Ming-Jun Li, Horseheads, NY (US); Daniel A. Nolan, Corning, NY (US); Gang Qi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 428 days.

(21) Appl. No.: 10/044,455

(22) Filed: Jan. 11, 2002

(65) Prior Publication Data

US 2002/0154877 A1 Oct. 24, 2002

Related U.S. Application Data

(60) Provisional application No. 60/271,754, filed on Feb. 26, 2001.

(51) Int. Cl.[7] .............................. G02B 6/22; G02B 6/18; G02B 6/16
(52) U.S. Cl. ........................ 385/127; 385/123; 385/124
(58) Field of Search ................................ 385/123–124, 385/126–128

(56) References Cited

U.S. PATENT DOCUMENTS

| | | | |
|---|---|---|---|
| 5,838,867 A | 11/1998 | Onishi et al. ............... | 385/123 |
| 6,445,864 B2 | 9/2002 | Jiang et al. | |
| 6,490,398 B2 * | 12/2002 | Gruner-Nielsen et al. .. | 385/123 |
| 6,501,892 B1 * | 12/2002 | Okuno et al. ............... | 385/127 |
| 6,546,178 B2 | 4/2003 | Jiang et al. ................. | 385/127 |
| 2002/0001444 A1 | 1/2002 | Hirano et al. | |
| 2003/0147612 A1 | 8/2003 | Jiang et al. ................. | 385/127 |

FOREIGN PATENT DOCUMENTS

| | | | |
|---|---|---|---|
| DE | 1035671 | 9/2000 | ........... H04B/10/18 |
| FR | 1067412 | 1/2001 | ............ G02B/6/16 |
| WO | WO 02/37718 | 5/2002 | ........... H04B/10/00 |

OTHER PUBLICATIONS

Gruner–Nielsen et al, "Dispersion Compensating Fibers", Optical Fiber Technology, vol. 6, Oct. 25, 1999, pp. 164–180.*

Lars Gruner–Nielsen et al., New Dispersion Compensating Fibres for Simultaneous Compensation of Dispersion and Dispersion Slope of Non–Zero Dispersion Shifted Fibres in the C or L Band, Optical Fiber Conference, 2000, TuG6–1, pp. 101–103.

Gruner–Nielsen et al., "Dispersion Compensating Fibers", Optical Fiber Technology, vol. 6, Oct. 25, 1999, pp. 164–180.

Jie et al., "The Relationship Between the Dispersion Characteristics of W–Profile Broadband Dispersion Compensation Fiber and its Structural Parameters", Journal of Optical Communications, vol. 21, No. 3, Jun. 2000, pp. 90–93.

* cited by examiner

Primary Examiner—Frank G. Font
Assistant Examiner—Michael P. Mooney
(74) Attorney, Agent, or Firm—Randall S. Wayland

(57) ABSTRACT

Disclosed is a total dispersion and total dispersion slope compensating optical waveguide fiber. The refractive index profile of the compensating waveguide fiber includes a core region having a central segment and two surrounding annular segments. In an embodiment of the compensating waveguide fiber, a first clad layer adjacent the core region has a refractive index lower than that of a second clad layer adjacent the first clad layer. The optical waveguide fiber in accord with the invention has negative total dispersion and negative total dispersion slope over the operating window of the fiber to be compensated. The invention includes a compensated optical waveguide fiber span which includes a high performance waveguide fiber and a compensating waveguide fiber in accord with the invention.

13 Claims, 9 Drawing Sheets

WAVEGUIDE FIBER FOR DISPERSION AND SLOPE COMPENSATION

This application claims the benefit of and priority to U.S. Provisional Patent Application No. 60/271,754, filed Feb. 26, 2001.

BACKGROUND OF THE INVENTION

1. Field of the Invention

The present invention relates generally to an optical waveguide fiber for dispersion compensation, and particularly to such a waveguide fiber that compensates dispersion and dispersion slope in a high performance optical fiber system.

2. Technical Background

Large effective area optical waveguide fibers have played a key role in enabling long distance, high data rate, wavelength division multiplexed systems. Data rates in the range of 40 GB/s over each of about forty channels have already been reached in commercial systems and even higher rates and channel counts are in the planning stage. Dispersion compensation is a protocol that was adopted early in the design of single channel high performance systems. To augment the beneficial effects of dispersion compensation for multi-channel wavelength division multiplexed systems, effectively extending the dispersion compensation over an extended operating wavelength band, the concept of dispersion slope compensation was introduced.

At present, the combination of improved transmitters and receivers, large effective area waveguide fibers, and dispersion and dispersion slope compensating fibers has increased fiber span length between electronic regeneration modules in high performance systems into the range of hundreds of kilometers.

Improvement in the properties of the compensating optical waveguide fibers can further increase span length between regenerators to decrease cost and at the same time enable even higher data rates. By means of such improvement, existing systems can be upgraded in terms of data rate, the data network can be expanded to reach a wider customer base, and the next generation of telecommunications systems can become a reality.

There is therefore a need for a dispersion and dispersion slope compensating optical waveguide fiber that has sufficiently high negative dispersion to decrease compensating waveguide fiber length, relatively low attenuation, and a ratio of total dispersion to total dispersion slope essentially equal to that of the new large effective area waveguide fibers.

DEFINITIONS

The following definitions are in accord with common usage in the art.

The refractive index profile is the relationship between refractive index or relative refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The radii of the segments of the core are defined in terms of the respective refractive indexes at respective beginning and end points of the segments. The definitions of the radii used herein are set forth in the figures and the discussion thereof.

The effective area is
$A_{eff}=2\pi(\int E^2 r\, dr)^2/(\int E^4 r\, dr)$, where the integration limits are 0 to $\infty$, and E is the electric field associated with light propagated in the waveguide.

The relative refractive index percent, $\Delta\% = 100 \times (n_i^2 - n_c^2)/2n_i^2$, where $n_i$ is the maximum refractive index in region i, unless otherwise specified, and $n_c$ is the average refractive index of the cladding region, which in this application is taken to the refractive index of silica, $SiO_2$.

The bend resistance of a waveguide fiber is expressed as induced attenuation under prescribed bending conditions. A bend test referenced herein is the pin array bend test that is used to compare relative resistance of waveguide fiber to bending. To perform this test, attenuation is measured for a waveguide fiber with essentially no induced bending loss. The waveguide fiber is then woven in a serpentine path through the pin array and attenuation again measured. The additional attenuation induced by bending is the difference between the two measured attenuation values. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the serpentine woven waveguide fiber conform to the portions of the pin surface at which there is contact between fiber and pin.

Total dispersion is the sum of material dispersion and waveguide dispersion present in an optical waveguide fiber.

End to end dispersion of a span of optical waveguide fibers is the amount of dispersion of a pulse traversing the length of the span. Mathematically, the end to end dispersion can be expressed as, $$\sum_l l_l D_l,$$

where, $l_l$ is the length of waveguide fiber having a total dispersion $D_l$. The sum of all the lengths $l_l$ is the span length.

SUMMARY OF THE INVENTION

One aspect of the present invention is a total dispersion and total dispersion slope compensating optical waveguide fiber having a segmented core region. The core includes a central segment surrounded by a first and a second annular segment. The central segment has relative index percent $\Delta_1\%$ greater than 1.4% and a radius less than 3 $\mu$m. The first annular segment has relative index $\Delta_2\%$ more negative than −0.3%, and radius $r_2$ greater than 6 $\mu$m. The second annular segment has relative index $\Delta_3\%$ greater than 0.15%, and radius $r_3$ greater than 9 $\mu$m. These segment parameters are chosen such that $\Delta_1\%$ is greater than $\Delta_3\%$, $r_3$ is greater than $r_2$, and, the combination of $\Delta_i\%$'s and $r_i$'s provide a negative total dispersion slope and a ratio of total dispersion to total dispersion slope in the range of 40 nm to 60 nm at a wavelength of 1550 nm.

In a particular embodiment of the segmented core in accord with the invention: $1.4\% \leq \Delta_1\% \leq 2\%$, $1.5\ \mu\text{m} \leq r_1 \leq 3.0\ \mu\text{m}$; $-0.3\% \leq \Delta_2\% \leq -0.45\%$, $6.0\ \mu\text{m} \leq r_2 \leq 8.0\ \mu\text{m}$; and, $0.15\% \leq \Delta_3\% \leq 0.85\%$, $9\ \mu\text{m} \leq r_3 \leq 12.0\ \mu\text{m}$. A preferred range of $\Delta_1\%$ is from 1.4% to 1.8%. The attenuation of an optical waveguide fiber made in accord with the invention has attenuation at 1550 nm less than 0.60 dB/km and total dispersion slope at 1550 nm more negative than −1.5 ps/nm²-km.

In a further embodiment of the invention in accord with this first aspect, the clad layer is divided into a first and a second layer. The first layer is nearer the core region and has a relative refractive index percent $\Delta_{c1}\%$ less than $\Delta_{c2}\%$, the relative index of the second clad. The radius $r_{1c}$ of the first clad layer is greater than 22 µm. The difference in relative index percent of the second clad layer compared to that of the first clad layer is less than or equal to 0.1%. This difference can be achieved by using an index decreasing dopant in the first clad layer or an index increasing dopant in the second clad layer. As an alternative, both clad layers may be doped to achieve the desired refractive index difference.

Another embodiment in accord with the first aspect of the invention $r_{1c}$ has a range from 25 µm to 35 µm and the difference between $\Delta_{c1}\%$ and $\Delta_{c2}\%$ has a range from 0.05% to 0.08%. In this embodiment, the radii and relative refractive index percents can be chosen to provide cut off wavelength, which includes cut off of both the $LP_{11}$ and the $LP_{02}$ modes (as is known in the art, cut off includes those configurations wherein the particular mode may be propagated, but is so highly attenuated that it is cut off for practical purposes), zero dispersion wavelength less than or equal to 1525 nm, attenuation at 1550 nm less than 0.60 dB/km, and dispersion slope at 1550 nm more negative than $-1.5$ ps/nm$^2$-km. Cut off wavelength in this application is the wavelength at or above which both the $LP_{11}$ and the $LP_{02}$ modes are not propagated (or are so highly attenuated that for practical purposes the modes are not propagated) in the optical waveguide fiber. The cut off wavelength refers to the fiber in a cabled configuration unless otherwise specified.

In another aspect, the present invention includes an optical waveguide fiber span that is compensated for total dispersion and total dispersion slope. The span includes a first optical waveguide fiber having a length $L_1$ and, at 1550 nm, a positive total dispersion and total dispersion slope and a second optical waveguide fiber having a length $L_2$ and, at 1550 nm, a negative total dispersion and total dispersion slope. In order for the two lengths to provide a compensated span, the ratio of total dispersion to dispersion slope for each of the waveguide fiber lengths should be equal or nearly equal. The ratios may differ by 5% at 1550 nm and still provide adequate compensation over the 1550 nm wavelength window, which usually extends from 1525 nm to 1575 nm. In the ideal case the ratios are equal so that compensation is equal across the operating wavelength window. However, if the ratios differ by 5%, a length of the compensating fiber can be chosen to completely compensate dispersion at a wavelength at the center of the operating window. Compensation at wavelengths +/−25 nm from the center wavelength can still be within about 2% of complete compensation.

A sample calculation illustrating this point is given below. It will be understood that the tolerance choice of 5% is appropriate for high performance systems. Other choices of tolerance can be made based upon the design criteria of a particular system. For example, if the wavelength window of operation is only 10 nm, a much higher tolerance on the ratio is allowable.

Because the attenuation of the compensating fiber in accord with the invention is typically higher than that of the fiber to be compensated, the length $L_2$ of the compensating fiber is advantageously small compared to the length $L_1$ of the compensated fiber. In particular the ratio $L_1/L_2$ is not less than 35. By proper choice of the lengths $L_1$ and $L_2$, essentially any end to end dispersion for the span can be achieved. A choice of zero end to end dispersion is desired in most systems. However, while end to end dispersion can be chosen to be zero, the local total dispersion along the span can be non-zero. For example, the local total dispersion along the fiber can be greater than or equal to 1.0 ps/nm-km at 1550 nm, an amount of total dispersion sufficient to effectively prevent non-linear dispersion due to four wave mixing.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
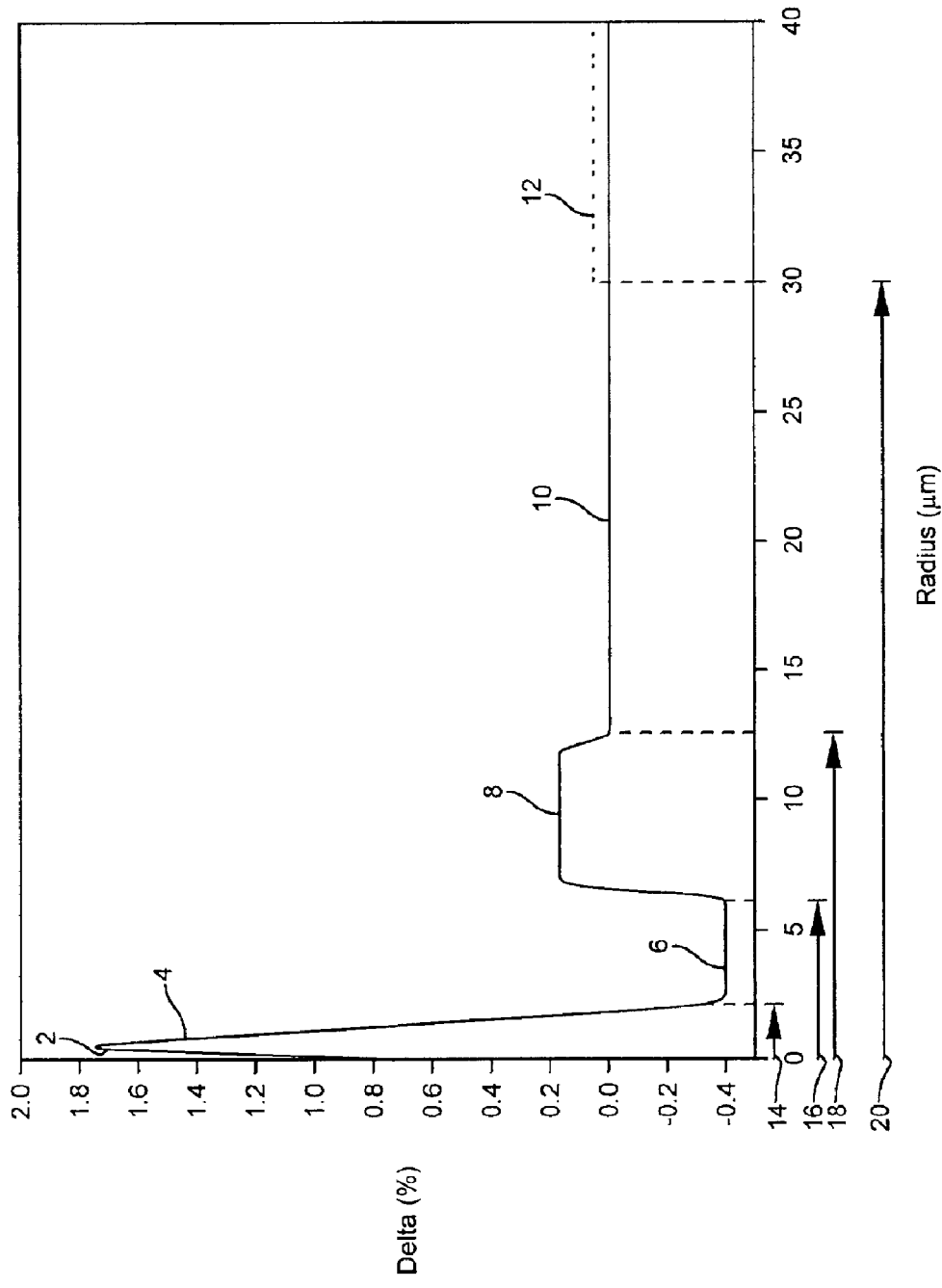
FIG. 1 is a refractive index profile of an optical waveguide fiber in accord with the invention.

Reference will now be made in detail to the present preferred embodiments of the invention, examples of which are illustrated in the accompanying drawings. An exemplary embodiment of the total dispersion and total dispersion slope compensating optical waveguide fiber of the present invention is shown in FIG. 1. The segmented core includes a central segment 4 having centerline refractive index depression 2, a first annular segment 6, and a second annular segment 8. The clad layer 10 surrounds the second annular core segment. Dotted line 12 indicates an optional clad layer having a relative index higher than that of adjacent clad layer 10.

The centerline depression 2 is shown for completeness. This depression is typically due to diffusion of dopant material out of the central core segment during preform processing. The depression 2 can be removed by appropriate doping of the central segment centerline. However, the depression is easily included in the model used to calculate the electric field propagating in the fiber so that such appropriate doping of the centerline in actual waveguide fiber manufacture is not required. By including the depression 2 in the model, manufacturing steps needed to make a refractive index profile in accord with the model are simplified. The manufacturing process is stable enough that significant differences in depression 2 do not occur among waveguide fibers drawn from different preforms, when the preforms are made using the same deposition protocol. Preform deposition can be carried out using any of the methods known in the art, including outside vapor deposition, inside vapor deposition, or axial vapor deposition.

The radius of the central segment 4 is shown as radius 14 drawn from the waveguide fiber centerline to the point of intersection of the extrapolated descending portion of segment 4 with the horizontal axis. Radius 16 of first annular segment 6 is drawn from the centerline to the point at which the relative index of segment 6 begins to increase, i.e., intersects the ascending portion of second annular segment 8. Radius 18 of second annular segment 8 is the point at which the descending leg of segment 8 reaches the relative index percent of clad layer 10, i.e., intersects clad layer 10. Radius 20 of clad layer 10 is drawn from the center line to the point at which the relative index begins to increase, i.e, the point of intersection of clad layer 10 and clad layer 12. The radius of clad layer 12 (not shown) extends from the centerline to the point at which the light power propagating in the waveguide fiber is less than about 1% of the peak power. It is known in the art that for the profiles disclosed and described herein, the radius of segment 12 need be no greater than 40 μm and typically is no greater than 35 μm.

The segments of the embodiments of FIGS. 2–4, 7 and 10 are similar to the embodiment of FIG. 1 and numbered the same as FIG. 1. The radii of FIGS. 2–4, 7, and 10 are also defined in accord with FIG. 1 and are not shown in FIGS. 2–4, 7, and 10.

Optical waveguide fibers made in accord with the invention and exemplified in FIGS. 1–4, 7, and 10 exhibit the properties desired for compensating total dispersion and total dispersion slope in a high performance system, for example in a system using larger effective area optical waveguide fiber. These properties are:

zero dispersion wavelength $\lambda_0$ from 1480 nm to 1520 nm (although, depending upon selection of the operating wavelength band, higher values of $\lambda_0$ can be acceptable);

total dispersion slope at 1550 nm $S_t$ from $-1.5$ ps/nm$^2$-km to $-4.0$ ps/nm$^2$-km;

total dispersion to $S_t$ ratio from 40 nm to 60 nm;

mode field diameter not less than 4.5 μm;

attenuation at 1550 nm not greater than 0.60 dB/km; and, cabled cut off wavelength (for both $LP_{11}$ and $LP_{02}$) not greater than 1525 nm.

EXAMPLE 1

A total dispersion and total dispersion compensating optical waveguide fiber was modeled in accord with FIG. 1. The respective relative refractive index percents and radii are:

central segment 4 relative index 1.76%;
radius 14 of central segment 2.19 μm;
first annular segment 6 relative index $-0.4\%$;
radius 16 of first annular segment 6.25 μm;
second annular segment 8 relative index 0.20%; and,
radius 18 of second annular segment 11.56 μm.

In this first model calculation, the relative refractive index of the second clad layer is zero.

The properties calculated are:
zero dispersion wavelength $\lambda_0$ 1499.5 nm;
total dispersion slope at 1550 nm $S_t$ $-3.59$ ps/nm$^2$-km;
total dispersion to $S_t$ ratio 50.5 nm;
mode field diameter 4.8 μm;
attenuation at 1550 nm 0.25 dB/km; and,
cut off wavelength of $LP_{11}$ 2260 nm and of $LP_{02}$ 1696 nm.

Comparison 1

The profile of example 1 was again modeled with the only change being:
relative index of segment 12 $\Delta_{c2}\%$ is 0.05%; and,
radius 20 of first clad layer is 30 μm.

In this comparison model, all optical waveguide fiber properties are the same except cut off wavelength of $LP_{11}$ is 1352 nm and of $LP_{02}$ is 1488 nm. The function of the relative index difference between the first and second clad layer is to lower cut off wavelength.

EXAMPLE 2

Figure 2:
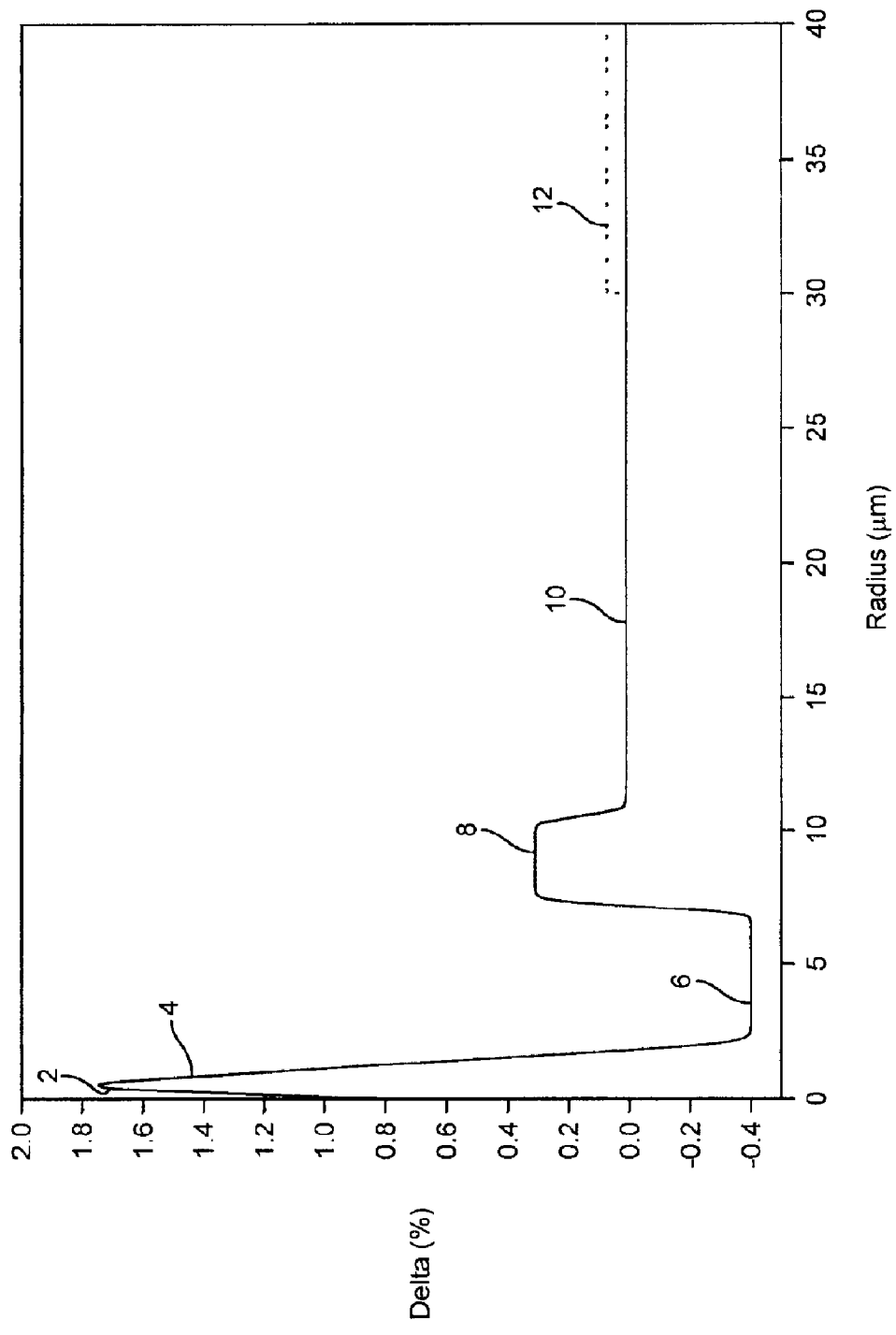
FIG. 2 is a refractive index profile of an optical waveguide fiber in accord with the invention.

A total dispersion and total dispersion compensating optical waveguide fiber was modeled in accord with FIG. 2. The respective relative refractive index percents and radii are:

central segment 4 relative index 1.76%;
radius 14 of central segment 2.19 μm;
first annular segment 6 relative index $-0.4\%$;
radius 16 of first annular segment 6.25 μm;
second annular segment 8 relative index 0.30%; and,
radius 18 of second annular segment 10.00 μm.

In this model calculation, the relative refractive index of the second clad layer is zero.

The properties calculated are:
zero dispersion wavelength $\lambda_0$ 1500 nm;
total dispersion slope at 1550 nm $S_t$ $-3.55$ ps/nm$^2$-km;
total dispersion to $S_t$ ratio 50 nm;
mode field diameter 4.8 μm;
attenuation at 1550 nm 0.25 dB/km; and,
cut off wavelength of $LP_{11}$ 2108 nm and of $LP_{02}$ 1692 nm.

Comparison 2

The profile of example 2 was again modeled with the only change being:
relative index of segment 12 $\Delta_{c2}\%$ is 0.06%; and,
radius 20 of first clad layer is 30 μm.

In this comparison model, all optical waveguide fiber properties are the same except cut off wavelength of $LP_{11}$ is 1405 nm and of $LP_{02}$ is 1512 nm.

EXAMPLE 3

Figure 3:
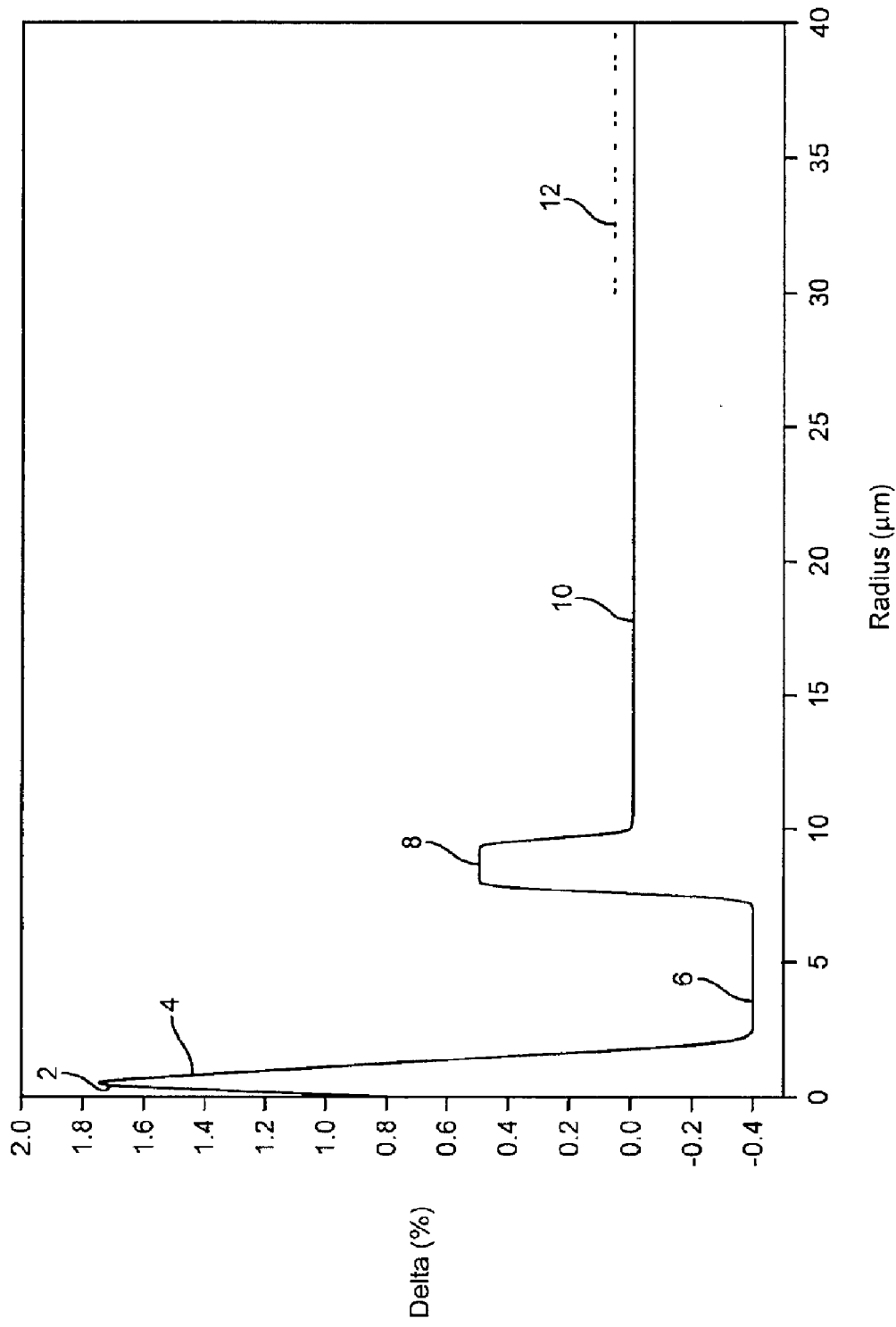
FIG. 3 is a refractive index profile of an optical waveguide fiber in accord with the invention.

A total dispersion and total dispersion compensating optical waveguide fiber was modeled in accord with FIG. 3. The respective relative refractive index percents and radii are:

central segment 4 relative index 1.76%;
radius 14 of central segment 2.19 μm;
first annular segment 6 relative index $-0.4\%$;
radius 16 of first annular segment 7.03 μm;

second annular segment 8 relative index 0.50%; and,
radius 18 of second annular segment 9.06 μm.

In this model, the relative refractive index of the second clad layer is zero.

The properties calculated are:
zero dispersion wavelength $\lambda_0$ 1500.2 nm;
total dispersion slope at 1550 nm $S_t$ −3.80 ps/nm$^2$-km;
total dispersion to $S_t$ ratio 49.9 nm;
mode field diameter 4.8 μm;
attenuation at 1550 nm 0.25 dB/km; and,
cut off wavelength of $LP_{11}$ 2050 nm and of $LP_{02}$ 1692 nm.

Comparison 3

The profile of example 3 was again modeled with the only change being:
relative index of segment 12 $\Delta_{c2}\%$ is 0.065%; and,
radius 20 of first clad layer is 30 μm.

In this comparison model, all optical waveguide fiber properties are the same except cut off wavelength is of $LP_{11}$ 1425 nm and of $LP_{02}$ 1513 nm.

EXAMPLE 4

Figure 4:
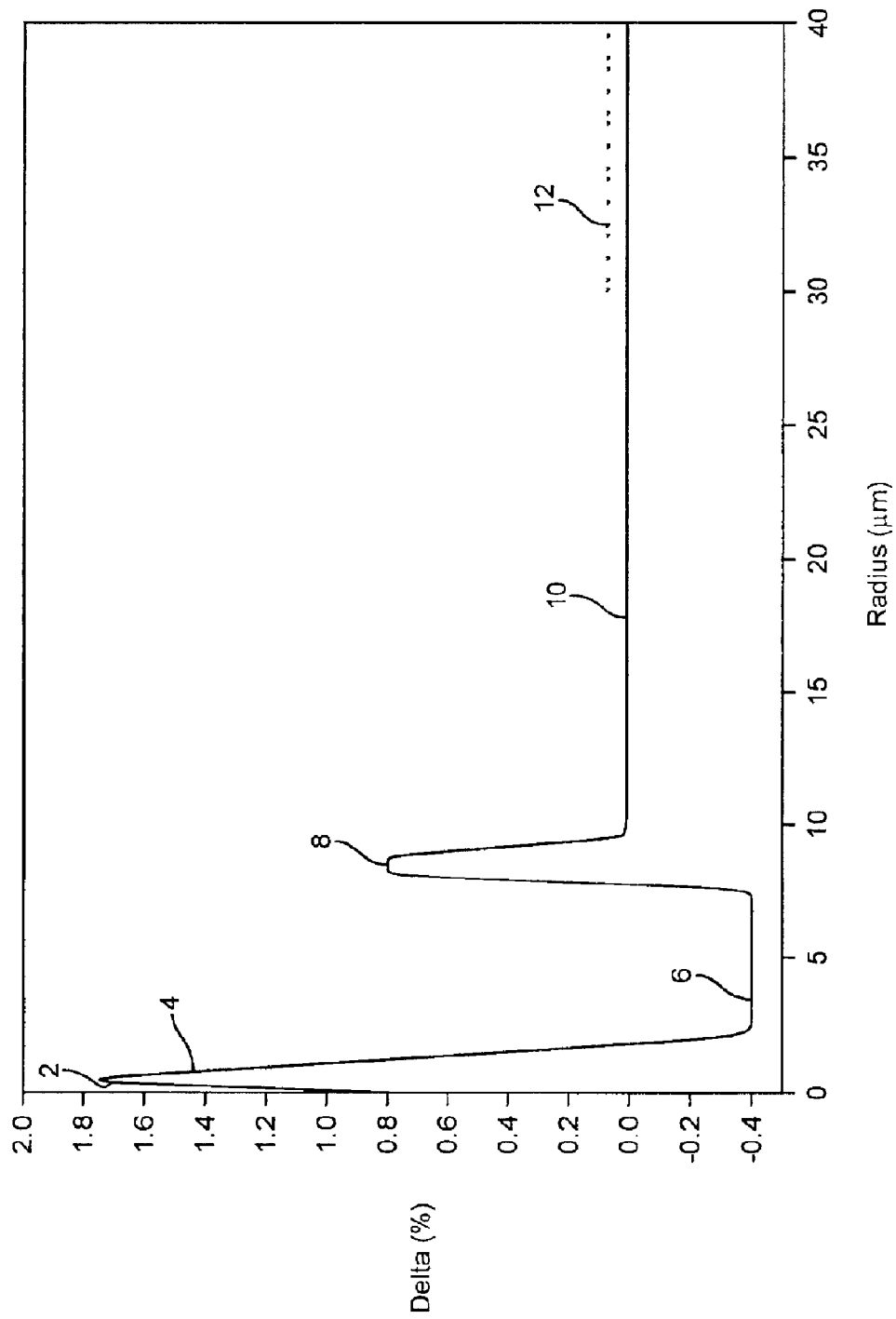
FIG. 4 is a refractive index profile of an optical waveguide fiber in accord with the invention.

A total dispersion and total dispersion compensating optical waveguide fiber was modeled in accord with FIG. 4. The respective relative refractive index percents and radii are:
central segment 4 relative index 1.76%;
radius 14 of central segment 2.03 μm;
first annular segment 6 relative index −0.4%;
radius 16 of first annular segment 7.5 μm;
second annular segment 8 relative index 0.80%; and,
radius 18 of second annular segment 9.69 μm.

In this model, the relative refractive index of the second clad layer is zero.

The properties calculated are:
zero dispersion wavelength λhd 0 1500.3 nm;
total dispersion slope at 1550 nm $S_t$ −3.97 ps/nm$^2$-km;
total dispersion to $S_t$ ratio 49.7 nm;
mode field diameter 4.8 μm;
attenuation at 1550 nm 0.25 dB/km; and,
cut off wavelength of $LP_{11}$ is 2021 nm and of $LP_{02}$ is 1692 nm.

Comparison 4

The profile of example 4 was again modeled with the only change being:
relative index of segment 12 $\Delta_{c2}\%$ is 0.067%; and,
radius 20 of first clad layer is 30 μm.

In this comparison model, all optical waveguide fiber properties are the same except cut off wavelength of $LP_{11}$ 1447 is nm and of $LP_{02}$ is 1523 nm.

In each of examples 1–4 the pin array bend loss was not greater than 57 and effective area had a range from 18.3 to 19 μm$^2$. The ratio of total dispersion to total dispersion slope for Corning LEAF® Fiber is about 50. The optical waveguide fiber made in accord with the invention is therefore well suited to being a total dispersion and total dispersion compensating waveguide fiber in systems using the LEAF® fiber.

Manufacturing Example 5

Figure 7:
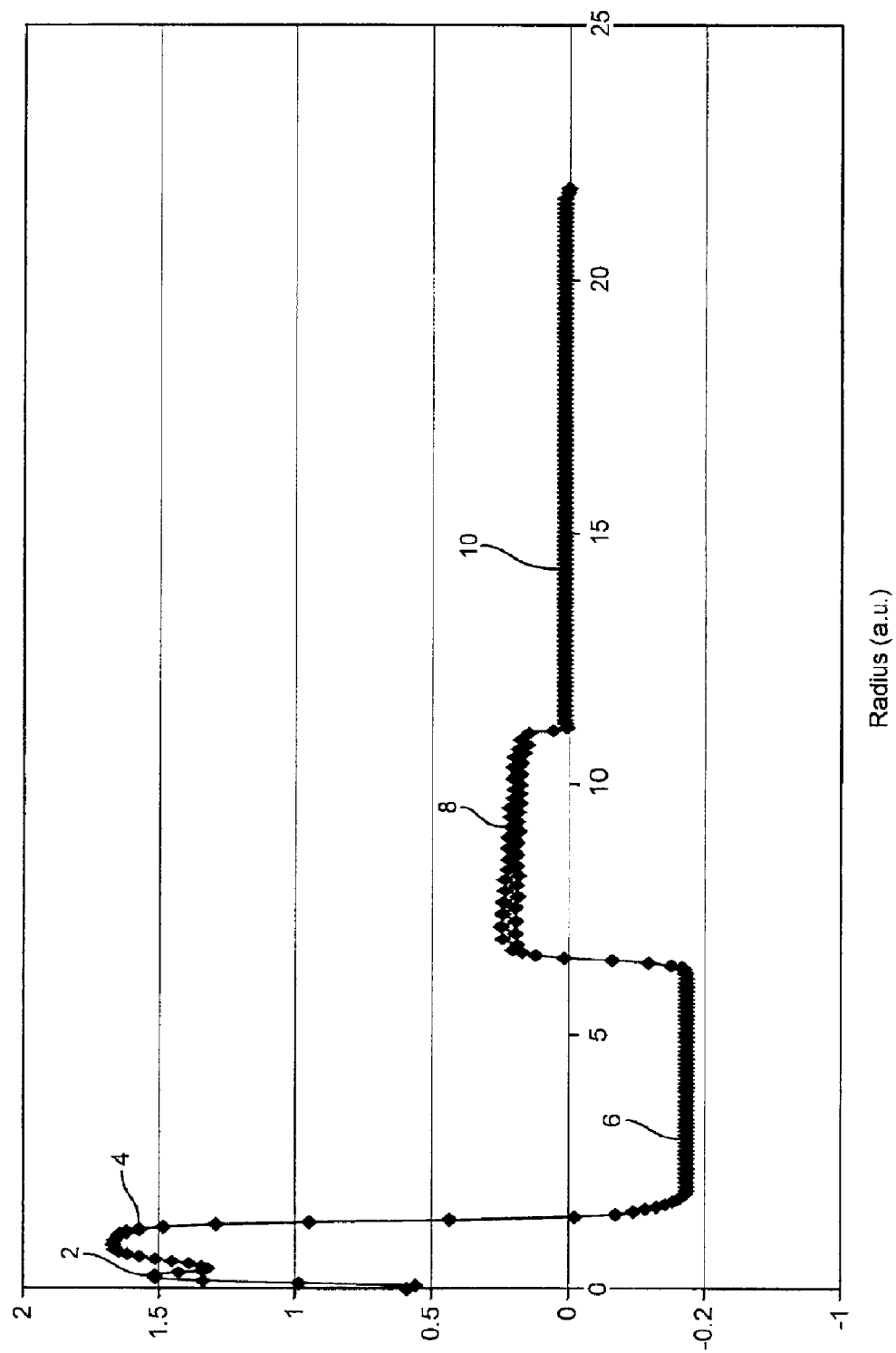
FIG. 7 is a refractive index profile of an optical waveguide fiber manufactured in accord with the invention.

A total dispersion and total dispersion compensating optical waveguide fiber was manufactured in accord with FIG. 7. The respective relative refractive index percents and radii are:

central segment 4 relative index 1.67%;
radius 14 of central segment 1.57 μm;
first annular segment 6 relative index −0.44%;
radius 16 of first annular segment 6.50 μm;
second annular segment 8 relative index 0.20% (near the geometric center of the segment); and,
radius 18 of second annular segment 11.13 μm.

In this manufactured fiber, the relative refractive index of the second clad layer is zero.

Figure 8:
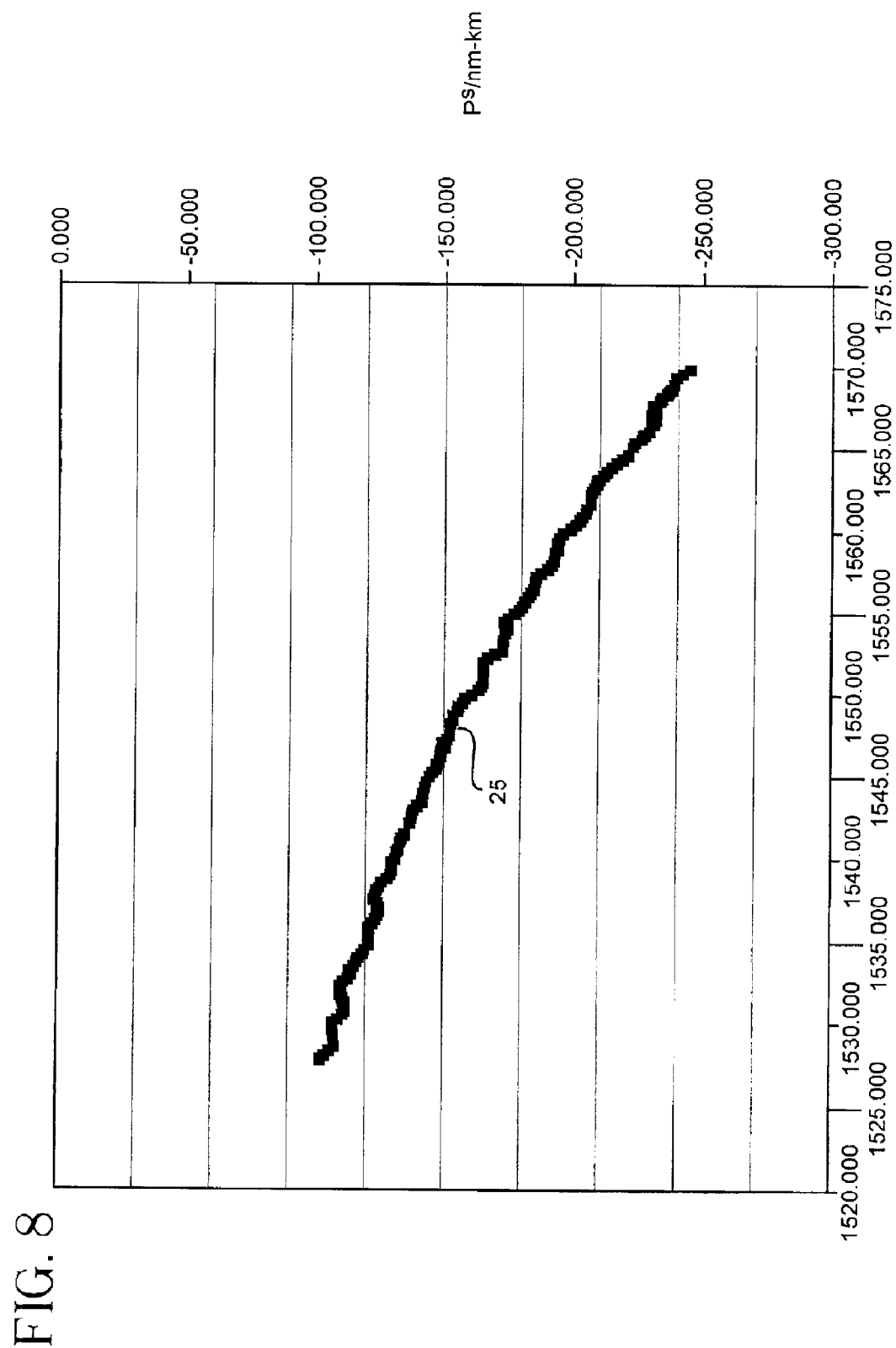
FIG. 8 is a chart of total dispersion versus wavelength for the manufactured optical waveguide fiber of FIG. 7.

The properties were measured to be (See FIG. 8, curve 25 for values of total dispersion and total dispersion slope):
zero dispersion wavelength $\lambda_0$ 1534 nm;
total dispersion slope at 1550 nm $S_t$ −2.67 ps/nm$^2$-km;
total dispersion to $S_t$ ratio (at 1550 nm) 56 nm; and,
attenuation at 1550 nm 0.60 dB/km.

Manufacturing Example 6

Figure 10:
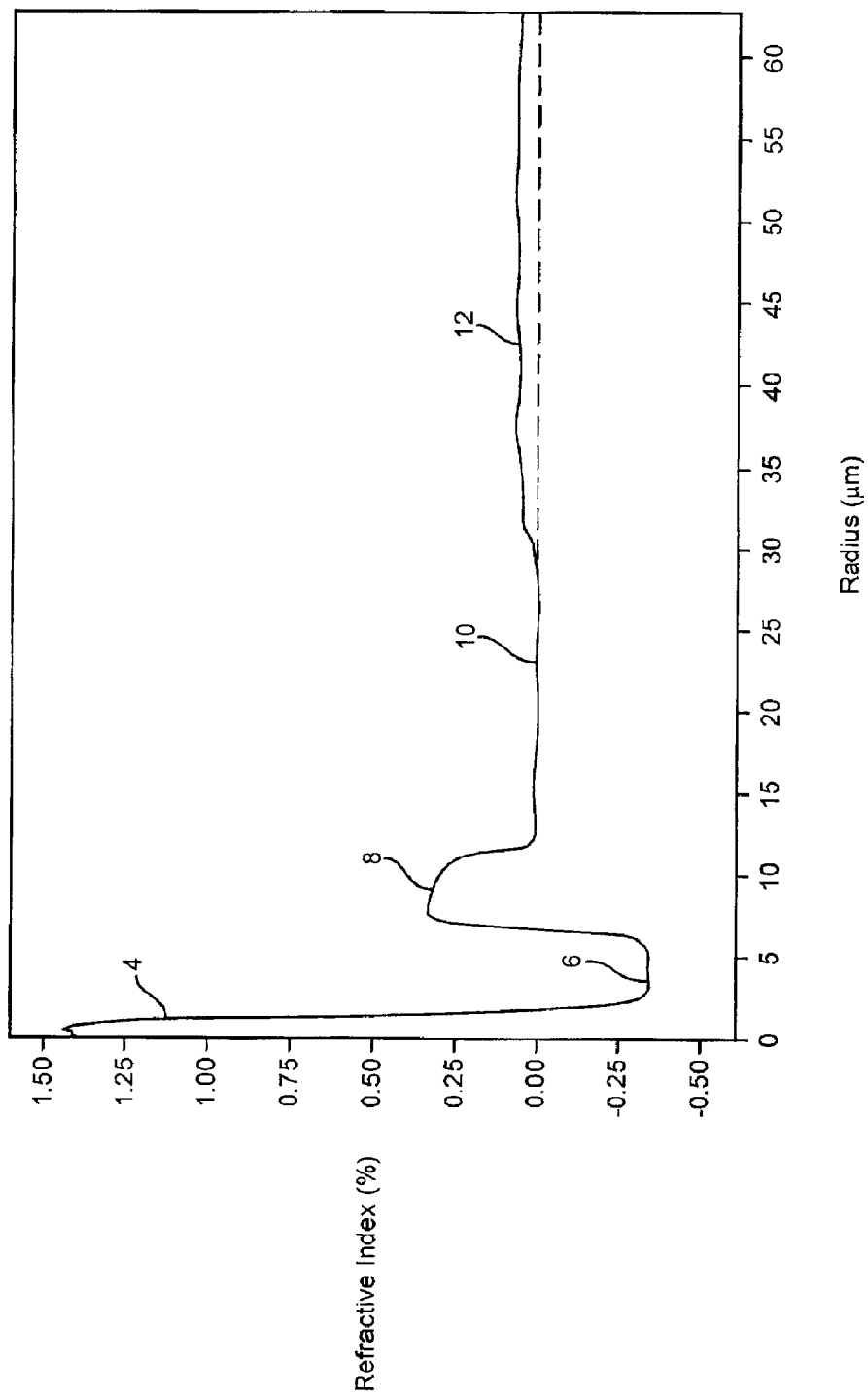
FIG. 10 is a refractive index profile of an optical waveguide fiber manufactured in accord with the invention.

A total dispersion and total dispersion compensating optical waveguide fiber was manufactured in accord with FIG. 10. The respective relative refractive index percents and radii are:
central segment 4 relative index 1.45%;
radius 14 of central segment 1.5 μm;
first annular segment 6 relative index −0.35%;
radius 16 of first annular segment 6.75 μm;
second annular segment 8 relative index 0.33%; and,
radius 18 of second annular segment 11.75 μm. The relative refractive index 12 of the second clad layer is 0.08% and the radius 20 of the second clad layer is 30 μm.

The properties measured are:
zero dispersion wavelength $\lambda_0$ 1496.5 nm;
total dispersion slope at 1550 nm $S_t$ −3.286 ps/nm$^2$-km;
total dispersion to $S_t$ ratio 50 nm;
mode field diameter 5.5 μm;
attenuation at 1550 nm 0.60 dB/km; and,
cut off wavelength of $LP_{11}$ and of $LP_{02}$ was 1738 for a fiber length of 2 meters, 1320 for a fiber length of 1 km, and 1270 for a fiber length of 2 km.

The profiles disclosed and claimed show the advantages of introducing a relative index difference between a first and a second clad layer. The respective cut off wavelengths of the next two higher modes $LP_{11}$ and $LP_{02}$, above the fundamental mode $LP_{01}$, can be adjusted without changing the other key parameter of the waveguide fiber.

Figure 5:
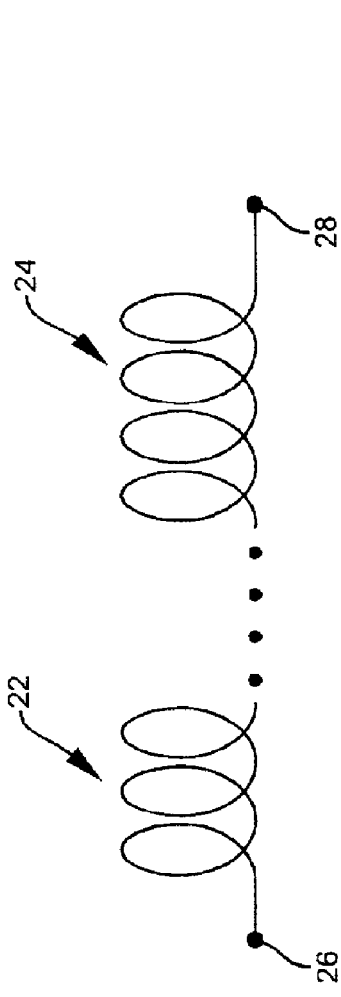
FIG. 5 is an illustration of a span of optical waveguide fiber including the compensating waveguide fiber in accord with the invention.

A compensated span of optical waveguide fiber is illustrated in FIG. 5. A high performance waveguide fiber 22, typically having low attenuation over a pre-selected operating wavelength window, large effective area, and low total dispersion is connected in series arrangement with the compensating optical waveguide fiber 24 made in accord with the invention. The dotted line connecting waveguide fibers 22 and 24 indicates that the length of the span is a variable to be selected. The span terminates in optical connections 26 and 28, respectively, which represent input ports for a coupler, a wavelength division multiplexing component, a receiver, or a transmitter. The dotted line also is intended to represent the possibility that components such as optical amplifiers may be incorporated into the span. The choice of components to be included in the span depends upon the desired span performance. The design of a span corresponding to a particular set of performance requirements, such as end to end attenuation, number of multiplexed channels, or channel spacing, is known in the art. The insertion of such components does not in general affect the refractive index profile or the length of the compensating optical waveguide fiber disclosed and described herein. Thus, such components will not be discussed further here.

A sample calculation is made to show how the total dispersion and total dispersion slope compensating fiber length is selected. The calculation set forth here also shows that adequate compensation over an extended wavelength band is possible even if the respective ratios (total dispersion to total dispersion slope) of fibers 22 and 24 are equal only to within 5%.

A high performance fiber 22 has total dispersion slope $S_{t1}=0.085$ ps/nm$^2$-km at 1550 nm, ratio 47.5 nm at 1550 nm, and length $L_1=100$ km. Then the end to end dispersion of fiber 22 is 404 ps/nm at 1550 nm, 489 ps/nm at 1560 nm, and 617 ps/nm at 1575 nm. Compensating waveguide fiber 24 in accord with the invention has total dispersion slope $S_{t2}=-3.5$ ps/nm$^2$-km at 1550 nm, ratio 50 (differs from that of fiber 22 by 5%) at 1550 nm, and a length $L_2$ selected to completely compensate the span at 1550 nm. Given these values, the length of the compensating waveguide fiber is found as $L_2=(404 \text{ ps/nm})/(3.5 \text{ ps/nm}^2\text{-km})=2.31$ km. The amount of dispersion compensation provided by this particular waveguide fiber in accord with the invention at 1560 nm is 484 ps/nm and at 1575 nm is 606 ps/nm. Thus at 1575 nm the compensating optical waveguide fiber compensates the span to within 2% of zero, i.e., perfect compensation.

Figure 6:
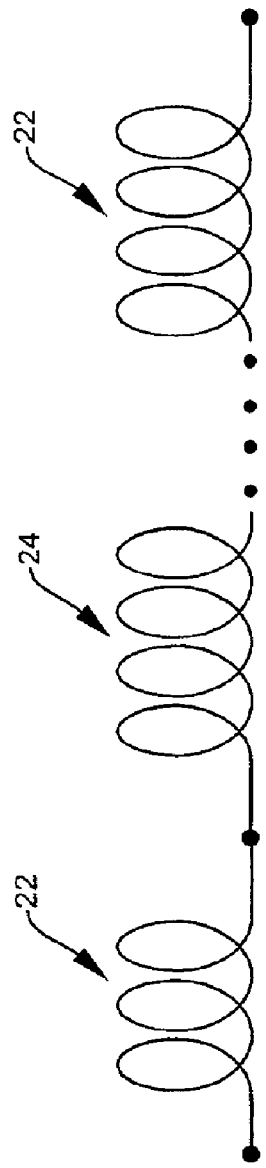
FIG. 6 is an illustration of a span of optical waveguide fiber including the compensating waveguide fiber in accord with the invention.

FIG. 6 is an alternative embodiment of the compensated span in accord with the invention. In this embodiment, the compensating fiber 24, which typically has lower effective area than high performance fiber 22, is connected in series arrangement with fibers 22 at either end. In this configuration, the span can be more effectively used for bi-directional transmission of optical signals. That is, the signal intensity is larger at points nearer the transmitter. By optically connecting fibers 22 to the transmitters at each end of the span, the highest intensity signal travels in the highest effective area optical waveguide fiber, thereby limiting non-linear dispersion effects.

System Example 7

Figure 9:
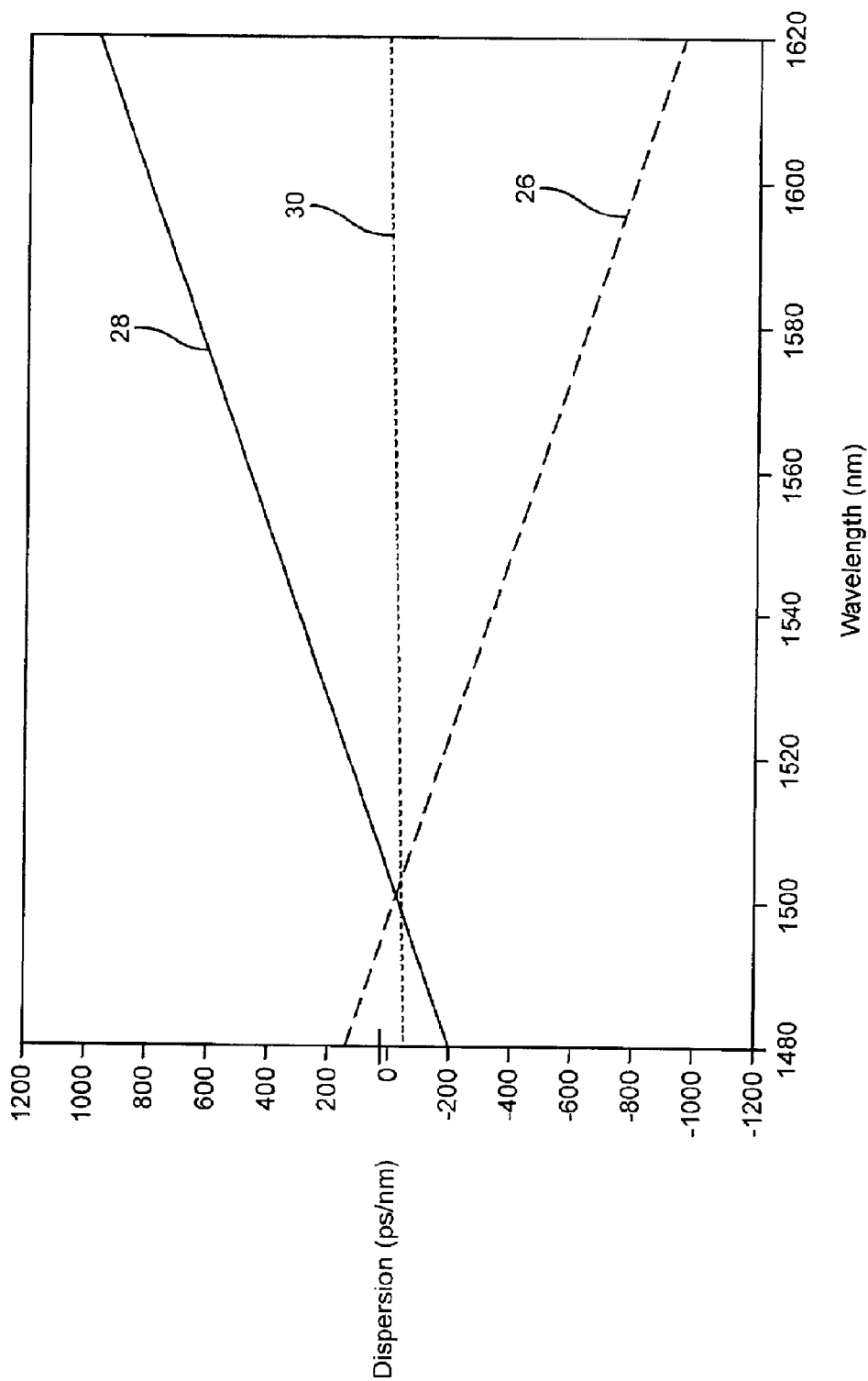
FIG. 9 is an illustrative chart of a dispersion compensated link in accord with the invention.

A compensated system in accord with the invention having 100 km of Corning LEAF® and 2.5 km of the negative total dispersion and negative total dispersion slope in accord with the invention was modeled. The results of the model are shown in FIG. 9. The total dispersion versus wavelength of the 100 km of LEAF® fiber is shown as curve 28. The total dispersion versus wavelength of the compensating waveguide fiber in accord with the invention is shown as curve 26. Because of the nearly equal ratio of total dispersion to total dispersion slope of the two waveguide types comprising the system, the end to end dispersion of the system, shown as curve 30 in FIG. 9 varies less that 60 ps over the wavelength range from 1480 nm to 1620 nm. Over the more limited range from about 1550 nm to 1620 nm, the compensation is nearly ideal, that is, there is essentially no variation in the compensation as wavelength changes.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

We claim:

1. A dispersion and dispersion slope compensating optical waveguide fiber comprising:

a core region surrounded by and in contact with a clad layer, said core region including three segments, a central segment and a first and a second annular segment surrounding said central segment, each said segment having respective radii, $r_i$, relative refractive index percents, $\Delta_i\%$, where i takes on values 1, 2, and 3 beginning with 1 for the central segment, and refractive index profiles; wherein, $\Delta_1\%$ is greater than 1.4%, $r_1$ is less than 3 μm;

$\Delta_2\%$ is more negative than −0.3%, $r_2$ is greater than 6 μm;

$\Delta_3\%$ is greater than 0.15%, $r_3$ is greater than 9 μm;

$\Delta_1\%$ is greater than $\Delta_3\%$, $r_3$ is greater than $r_2$; and, the combination of $\Delta_i\%$'s and $r_i$'s is selected to provide a negative total dispersion slope more negative than −1.5 ps/nm$^2$-km at 1550 nm and a ratio of total dispersion to total dispersion slope in the range of 40 nm to 60 nm at a wavelength of 1550 nm.

2. The compensating optical waveguide fiber of claim 1 wherein;

$1.4\% \leq \Delta_1\% \leq 2\%$, $1.5$ μm $\leq r_1 \leq 3.0$ μm;

$-0.3\% \leq \Delta_2\% \leq -0.45\%$, $6.0$ μm $\leq r_2 \leq 8.0$ μm; and, $0.15 \leq \Delta_3\% \leq 0.85\%$, $9$ μm $\leq r_3 \leq 12.0$ μm.

3. The compensating waveguide of either one of claims 1 or 2 wherein attenuation at 1550 nm is less than 0.60 dB/km.

4. A dispersion and dispersion slope compensating optical waveguide fiber comprising:

a core region surrounded by and in contact with a clad layer, said core region including three segments, a central segment and a first and a second annular segment surrounding said central segment, each said segment having respective radii, $r_i$, relative refractive index percents, $\Delta_i\%$, where i takes on values 1, 2, and 3 beginning with 1 for the central segment, and refractive index profiles; wherein, $\Delta_1\%$ is greater than 1.4%, $r_1$ is less than 3 μm;

$\Delta_2\%$ is more negative than −0.3%, $r_2$ is greater than 6 μm;

$\Delta_3\%$ is greater than 0.15%, $r_3$ is greater than 9 μm;

$\Delta_1\%$ is greater than $\Delta_3\%$, $r_3$ is greater than $r_2$; and, the combination of $\Delta_i\%$'s and $r_i$'s is selected to provide a negative total dispersion slope and a ratio of total dispersion to total dispersion slope in the range of 40 nm to 60 nm at a wavelength of 1550 nm further including a first and a second clad layer, said first layer being nearer the core region, each said layer having respective radii, $r_{cj}$, relative refractive index percents, $\Delta_{cj}\%$, where j takes on values 1 and 2, the value 1 corresponding to an inner clad layer and the value 2 to an outer clad layer, wherein;

$\Delta_{c1}\% < \Delta_{c2}\%$, $r_{1c} > 22$ μm, and the difference between $\Delta_{c2}\%$ and $\Delta_{c1}\%$ is less than or equal to 0.1%.

5. The compensating optical waveguide fiber of claim 4 wherein $r_{1c}$ has a range from 25 μm to 35 μm and the difference between $\Delta_{c1}\%$ and $\Delta_{c2}\%$ has a range from 0.05% to 0.08%.

6. The compensating optical waveguide fiber of claim 5 wherein both cut off wavelength and zero dispersion wavelength are less than or equal to 1525 nm.

7. The compensating optical waveguide fiber of claim 6 wherein attenuation at 1550 nm is less than 0.60 dB/km and total dispersion slope is more negative than −1.5 ps/nm$^2$-km at 1550 nm.

8. A total dispersion and total dispersion slope compensated optical waveguide fiber span comprising;

a first length $L_1$ of optical waveguide fiber having, at 1550 nm, a positive total dispersion and total dispersion slope;

a second length $L_2$ of optical waveguide fiber having, at 1550 nm, a negative total dispersion and negative total dispersion slope, said second length optically coupled in series arrangement with said first length; wherein, the ratio of total dispersion to total dispersion slope, at 1550 nm of said first and second lengths are equal to each other to within 5%, the ratio of the first length to the second length is not less than 35, and the end to end total dispersion of said span has a pre-selected value at 1550 nm wherein the pre-selected end to end total dispersion at 1550 nm is zero and the local total dispersion along said span has a magnitude greater than or equal to 1.0 ps/nm-km.

9. A total dispersion and total dispersion slope compensated optical waveguide fiber span comprising;

a first length $L_1$ of optical waveguide fiber having, at 1550 nm, a positive total dispersion and total dispersion slope;

a second length $L_2$ of optical waveguide fiber having, at 1550 nm, a negative total dispersion and negative total dispersion slope, said second length optically coupled in series arrangement with said first length; wherein, the ratio of total dispersion to total dispersion slope, at 1550 nm of said first and second lengths are equal to each other to within 5%, the ratio of the first length to the second length is not less than 35, and the end to end total dispersion of said span has a pre-selected value at 1550 nm wherein the ratio of total dispersion to total dispersion slope at 1550 nm for both said first and second optical waveguide fiber lengths have a range from 40 nm to 60 nm.

10. A total dispersion and total dispersion slope compensated optical waveguide fiber span comprising;

a first length $L_1$ of optical waveguide fiber having, at 1550 nm, a positive total dispersion and total dispersion slope;

a second length $L_2$ of optical waveguide fiber having, at 1550 nm, a negative total dispersion and negative total dispersion slope, said second length optically coupled in series arrangement with said first length; wherein, the ratio of total dispersion to total dispersion slope, at 1550 nm of said first and second lengths are equal to each other to within 5%, the ratio of the first length to the second length is not less than 35, and the end to end total dispersion of said span has a pre-selected value at 1550 nm wherein said second length of optical waveguide fiber includes a core region surrounded by and in contact with a clad layer, said core region including three segments, a central segment and a first and a second annular segment, each said segment having respective radii, $r_i$, relative refractive index percents, $\Delta_i\%$, where i takes on values 1, 2, and 3 beginning with 1 for the central segment, and a refractive index profile; wherein, $\Delta_1\%$ is greater than 1.4%, $r_1$ is less than 3 μm;

$\Delta_2\%$ is more negative than −0.3%, $r_2$ is greater than 6 μm;

$\Delta_3\%$ is greater than 0.15%, $r_3$ is greater than 9 μm;

$\Delta_1\%$ is greater than $\Delta_3\%$, $r_3$ is greater than $r_2$.

11. The compensated span of claim 10 wherein said second optical waveguide fiber length has core segment values:

$1.4\% \leq \Delta_1\% \leq 2\%$, $1.5 \text{ μm} \leq r_1 \leq 3.0 \text{ μm}$;

$-0.3\% \leq \Delta_2\% \leq -0.45\%$, $6.0 \text{ μm} \leq r_2 \leq 8.0 \text{ μm}$; and, $0.15\% \leq \Delta_3\% \leq 0.85\%$, $9 \text{ μm} \leq r_3 \leq 12.0 \text{ μm}$.

12. The compensated span of claim 11 wherein said second length of optical waveguide fiber further includes a first and a second clad layer, each said layer having respective radii, $r_{cj}$, relative refractive index percents, $\Delta_{cj}\%$, where j takes on values 1 and 2, the value 1 corresponding to an inner clad layer and the value 2 to an outer clad layer, wherein;

$\Delta_{c1}\% < \Delta_{c2}\%$, $r_{1c} > 22$ μm, and the difference between $\Delta_{c2}\%$ and $\Delta_{c1}\%$ is less than or equal to 0.1%.

13. The compensated span of claim 12 wherein said second length of optical waveguide fiber has, at 1550 nm, a slope more negative than −1.5 ps/nm²-km, an attenuation less than 0.60 dB/km, and a cut off wavelength less than 1525 nm.

* * * * *